United States Patent
Maranville et al.

(10) Patent No.: US 9,597,945 B2
(45) Date of Patent: Mar. 21, 2017

(54) AUTOMOTIVE HVAC SYSTEM WITH SUCTION SURFACES TO CONTROL LOCAL AIRFLOW

(75) Inventors: Clay W. Maranville, Ypsilanti, MI (US); Christopher M. Greiner, Birmingham, MI (US); Paul B. Hoke, Plymouth, MI (US); Michael E. Hesse, Ann Arbor, MI (US); Lakhi Goenka, Ann Arbor, MI (US); John C. Schneider, Ypsilanti, MI (US)

(73) Assignees: Ford Global Technologies, LLC, Dearborn, MI (US); Visteon Global Technologies, Inc., Van Buren Township, MI (US)

( * ) Notice: Subject to any disclaimer, the term of this patent is extended or adjusted under 35 U.S.C. 154(b) by 1302 days.

(21) Appl. No.: 13/156,500

(22) Filed: Jun. 9, 2011

(65) Prior Publication Data
US 2012/0315835 A1    Dec. 13, 2012

(51) Int. Cl.
  *B60H 1/00*    (2006.01)
(52) U.S. Cl.
  CPC ..... *B60H 1/00742* (2013.01); *B60H 1/00842* (2013.01)
(58) Field of Classification Search
  USPC .......................................................... 454/75
  See application file for complete search history.

(56) References Cited

U.S. PATENT DOCUMENTS

| | | | |
|---|---|---|---|
| 3,394,887 A * | 7/1968 | Megargle et al. | 237/12.3 A |
| 3,908,900 A | 9/1975 | Smith | |
| 4,800,951 A * | 1/1989 | Sakurai | 165/203 |
| 5,450,894 A * | 9/1995 | Inoue et al. | 165/43 |
| 6,105,667 A * | 8/2000 | Yoshinori et al. | 165/202 |
| 6,273,127 B1 | 8/2001 | Wade | |
| 6,871,696 B2 * | 3/2005 | Aoki et al. | 165/43 |
| 7,100,978 B2 | 9/2006 | Ekern et al. | |
| 7,793,706 B2 | 9/2010 | Archibald et al. | |
| 7,827,805 B2 | 11/2010 | Comiskey et al. | |
| 7,828,050 B2 * | 11/2010 | Esaki | 165/202 |

(Continued)

FOREIGN PATENT DOCUMENTS

| | | |
|---|---|---|
| CN | 1300254 A | 6/2001 |
| DE | 102008063152 A1 | 5/2010 |
| EP | 1086837 B1 | 3/2001 |

*Primary Examiner* — Steven B McAllister
*Assistant Examiner* — Ko-Wei Lin
(74) *Attorney, Agent, or Firm* — Vichit Chea; MacMillan, Sobanski & Todd, LLC

(57) ABSTRACT

An HVAC system provides airflow in a vehicle having a plurality of seating locations in a passenger cabin for respective passengers of the vehicle. The system includes a plurality of outlet vents and a plurality of suction returns disposed at various air return locations adjacent to the seating locations within the vehicle. An air handling unit is in fluid communication between the suction returns and the outlet vents. A plurality of flow control elements are provided, each one in series with at least one respective suction return for selectably modifying a respective flow of the respective suction return in response to a respective flow command. An occupancy determining apparatus identifies one or more seating locations for receiving enhanced airflow. A controller generates the respective flow commands in response to the identified seating locations.

24 Claims, 9 Drawing Sheets

(56) References Cited

U.S. PATENT DOCUMENTS

| | | | |
|---|---|---|---|
| 7,971,931 B2* | 7/2011 | Lazanja et al. | 297/180.14 |
| 8,091,623 B2* | 1/2012 | Hackl et al. | 165/202 |
| 8,382,563 B2* | 2/2013 | Sievers et al. | 454/126 |
| 8,393,162 B2* | 3/2013 | Chung | 62/3.61 |
| 2003/0037918 A1* | 2/2003 | Lee et al. | 165/202 |
| 2007/0095517 A1* | 5/2007 | Schall | 165/204 |
| 2007/0125521 A1* | 6/2007 | Itou | 165/96 |
| 2008/0248736 A1* | 10/2008 | Aoki et al. | 454/75 |
| 2009/0081938 A1* | 3/2009 | Kim | 454/75 |
| 2010/0043470 A1* | 2/2010 | Kang et al. | 62/239 |
| 2012/0214392 A1* | 8/2012 | Kanemaru et al. | 454/75 |
| 2012/0276831 A1* | 11/2012 | Wang et al. | 454/75 |

* cited by examiner

AUTOMOTIVE HVAC SYSTEM WITH SUCTION SURFACES TO CONTROL LOCAL AIRFLOW

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive heating, ventilating, and air conditioning (HVAC) systems, and, more specifically, to tailored flow patterns of moving air in an HVAC system.

Some of the register vents in automotive vehicles supplying conditioned air from one or more air handling units (AHU) can be manually adjusted in order to aim the air at specific body areas. In particular, register vents on the instrument panel are usually of this type. Other registers such as floor registers and window defrost registers are not typically adjustable. Although the user has some capability to customize the airflow pattern, the conventional arrangements have achieved only limited capacity to customize the flow. For example, not all desired areas may be covered within the adjustability range of the adjustable vents. Directing air toward one area may mean that it is taken away from another area where is it also desired. It becomes difficult to control the amount of conditioned air directed to body areas not within the direct circulation from the aimed vents, so that some body areas may become too warm or cold at the expense of other body areas. On the other hand, conventional systems have limited ability to reduce airflow to areas where it may not be needed. Manually closing off a register vent supplying an area where it is not needed may be inconvenient or impossible during driving.

When the HVAC system operates in recirculation mode, interior air is directed back into the blower of the AHU instead of fresh, outside air. Conventionally, the interior air is captured at the front passenger footwell. The resulting air circulation fails to provide full thermal conditioning of occupants who are not directly impinged by air flowing from a register. With the return flow being picked up in the front passenger footwell, the recirculated air passing into the rear seating area or to critical areas for a driver or front passenger (e.g., top of head, pelvis, etc) is limited. The neglect of rear seat occupants may be especially undesirable in some circumstances such as in chauffeured vehicles with paying passengers in the back of the vehicle. Moreover, occupant comfort is better served when air is supplied at a low or diffuse flow. Thus, it would be desirable to avoid the necessity of high speed, directional flows to achieve any desired heating or cooling effect—but it is difficult for diffuse flow or low velocity flow to provide a tailored experience for an individual occupant since the diffuse air pattern is typically non-directional.

In order to produce thermal comfort, HVAC systems have often been oversized in order to provide heating or cooling to the occupant as quickly as possible, with limited regard to the impact on system efficiency or vehicle fuel economy. This trade-off is becoming less desirable as vehicle efficiency becomes more critical in buyer decisions. Thus, it would be desirable to achieve improved efficiency while providing increased passenger comfort.

SUMMARY OF THE INVENTION

The invention includes a system and method to control and direct airflow in a passenger cabin that is tailored for individual occupant thermal comfort. It employs suction surfaces positioned strategically in the cabin that can be turned on or off, thereby providing the HVAC system the ability to substantially alter the airflow pattern in the vehicle. The system includes a number of ventilation suction returns that have integral flow control valves set up to provide the ability to tune cabin flow based on the number and location of occupants. The suction surfaces can be located in the side of seats or seat cushions, center console, A/B/C pillar inner trim panels, floor sills, rear bench or rear seat locations, package tray, or headliner. A low pressure region is created near these suction returns by the low-side pressure (i.e., suction) from a blower fan connected to the suction return. The fan may be the main HVAC blower fan connected through a duct or series of ducts, or it may be a dedicated fan associated with one or more suction surfaces that exhausts back into the passenger cabin, preferably in an inconspicuous area such as near the floor. By virtue of the combination of diffuse flow from a high pressure to low pressure region together with the streamlines of forced air directed towards the low pressure regions by the register vents, greater control of airflow patterns is obtained. In addition, valves provided in series with the suction returns can modulate the specific timing, duration, and location of the low pressure regions to dynamically tailor the airflow pattern. Automatic control can be implemented in response to cabin temperature, environmental conditions, or seat occupancy, or manual control can be implemented by the vehicle occupants through a human interface.

The suction surface can be attached to an independent fan/blower with or without a duct. The duct may or may not attach back to the main HVAC blower. For example, a suction surface in a seat pulled by an independent fan can simply vent down to the floor or via a duct direct some of the airflow back toward the rear or toward the front of the cabin (or both depending on ducting). The fan/blower can also be reversible and can possibly attached to different ducts and/or valve actuators for an independent control. The system could then provide improved airflow even when the main HVAC is in Fresh mode or partial recirculation mode when the suction forces would otherwise be nonexistent or too weak.

In one aspect of the invention, an HVAC system provides an airflow in a vehicle having a plurality of seating locations in a passenger cabin for respective passengers of the vehicle. The system includes a plurality of outlet vents and a plurality of suction returns disposed at various air return locations adjacent to the seating locations within the vehicle. An air handling unit is in fluid communication between the suction returns and the outlet vents. A plurality of flow control elements are provided, each one in series with at least one respective suction return for selectably modifying a respective flow of the respective suction return in response to a respective flow command. The control element may be a dedicated fan or a valve that couples the respective suction return to a main HVAC fan via a duct. An occupancy determining apparatus identifies one or more seating locations for receiving enhanced airflow. A controller generates the respective flow commands in response to the identified seating locations.

DETAILED DESCRIPTION OF PREFERRED EMBODIMENTS

Figure 1:
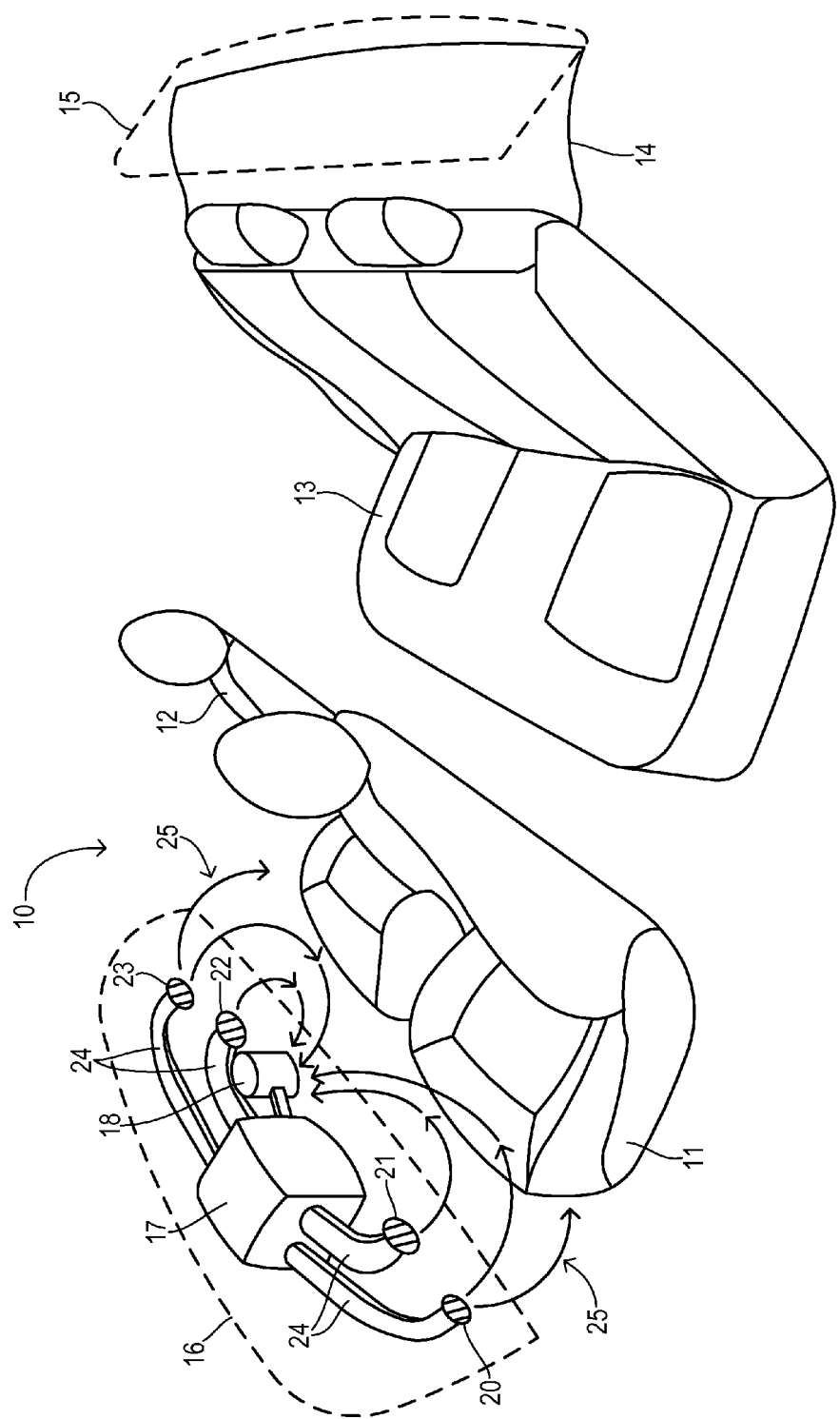
FIG. 1 is a perspective view of a passenger cabin showing air circulation in a prior art recirculation mode.

Referring now to FIG. 1, a passenger cabin 10 includes a driver seat 11, front passenger seat 12, and rear passenger bench seat 13. Behind rear seat 13 are a package tray 17 and a rear window 15. In front of front seats 11 and 12, an instrument panel 16 conceals portions of an HVAC system including a heat exchanger 17 and a blower 18. Heat exchanger 17 and blower 18 together comprise an air handling unit (AHU). Installed in the surface of instrument panel 16 are a plurality of register vents 20-23 each coupled to receive conditioned air from heat exchanger 17 via respective ducts 24. Heat exchanger 17 typically includes an evaporator for cooling the air and a heater core for heating the air.

As known in the art, the HVAC system may operate in a fresh air mode, a recirculation mode, or a partial combination of the two. In fresh air mode, the blower receives outside air and supplies it to heat exchanger 17 for distribution into the passenger cabin. To avoid built up of air pressure in the cabin, air leaks from the passenger cabin to the external environment via air extractors (not shown). Air diffuses out through the air extractor in a manner that has little effect on airflow patterns in the passenger cabin.

In the prior art recirculation mode of operation, air from the footwell area in front of the front seat passenger is supplied to blower 18 for passing into heat exchanger 17 before being redistributed back to the passenger cabin. As shown by the flow arrows 25 in FIG. 1, the airflow pattern when in the recirculation mode tends to neglect the area of rear seat 13.

Figure 2:
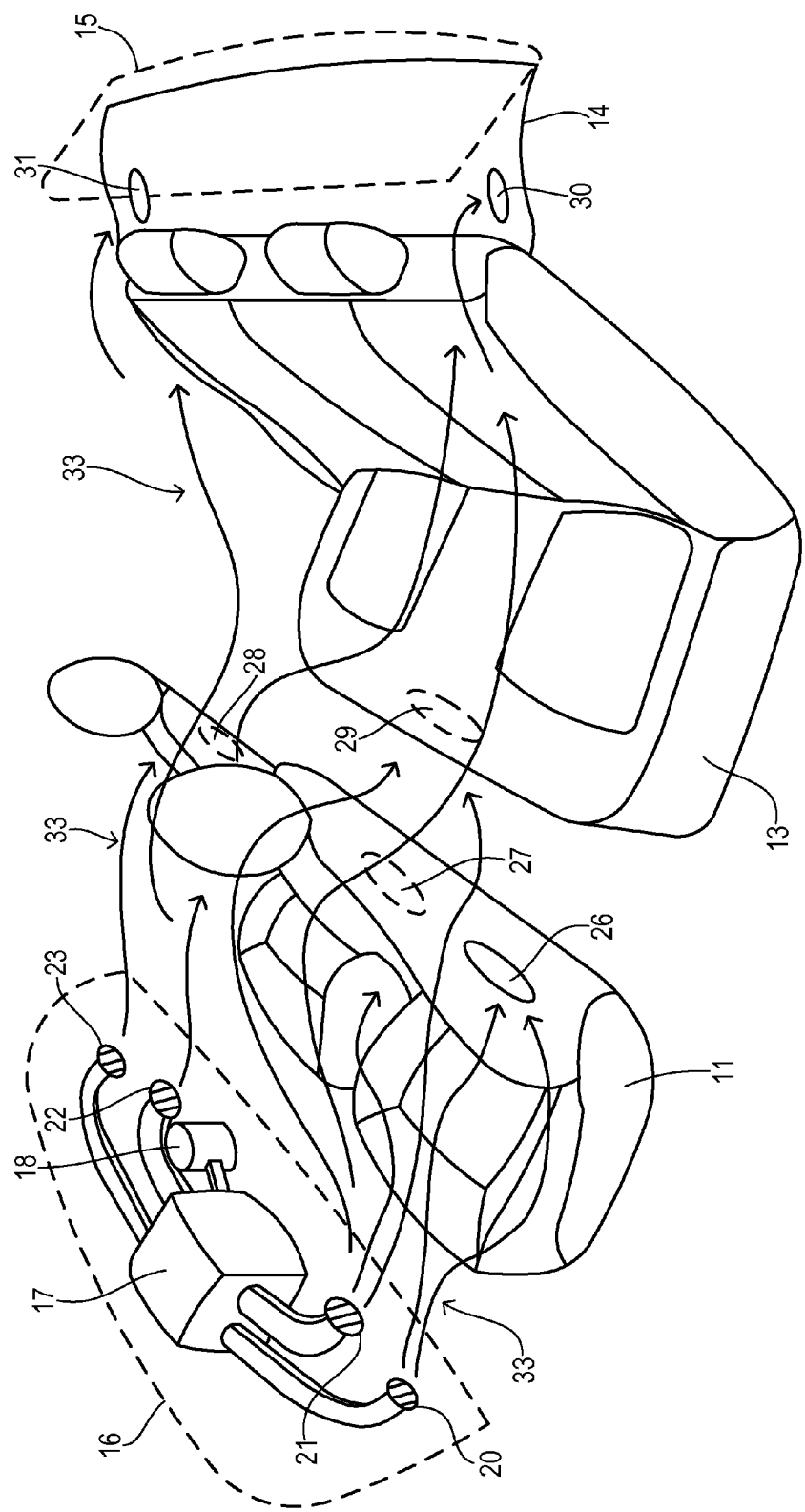
FIG. 2 is a perspective view of a passenger cabin showing air circulation resulting from suction returns according to the present invention.

The present invention introduces a plurality of suction returns disposed at various air return locations adjacent some or all of the seating locations within the vehicle to obtain an improved airflow pattern as shown in FIG. 2. Thus, driver seat 11 may have a suction return 26 in one side of the seat backrest and/or a suction return 27 on the other side of the backrest. Likewise, passenger seat 12 may include a suction return 28. Suction returns 26-28 are in fluid communication with blower 18 via ducts (not shown) that may pass from within the seats through various trim components such as a center console to reach blower 18 or with a dedicated, local fan (not shown) that is in communication with blower 18 through the cabin airspace.

Additional suction returns associated with rear seat positions 13 include a floorwell suction return 29 and rear package tray suction returns 30 and 31 (each in fluid communication with blower 18). With suction returns 29, 30, or 31 activated, a flow pattern illustrated by arrows 33 is obtained which provides greater airflow to rear seat 13.

Figure 3:
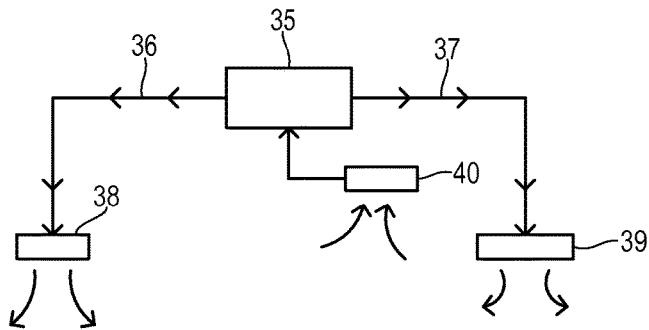
FIG. 3 is a schematic view of air circulation according to the prior art.

The prior art architecture is shown schematically in FIG. 3. A heat exchanger 35 such as an evaporator and heater core supply conditioned air to ducts 36 and 37 which inject the conditioned air into the passenger cabin via register vents 38 and 39, respectively. A blower 40 includes an intake which receives air from the passenger cabin and supplies it to heat exchanger 35 for distribution via ducts 36 and 37.

Figure 4:
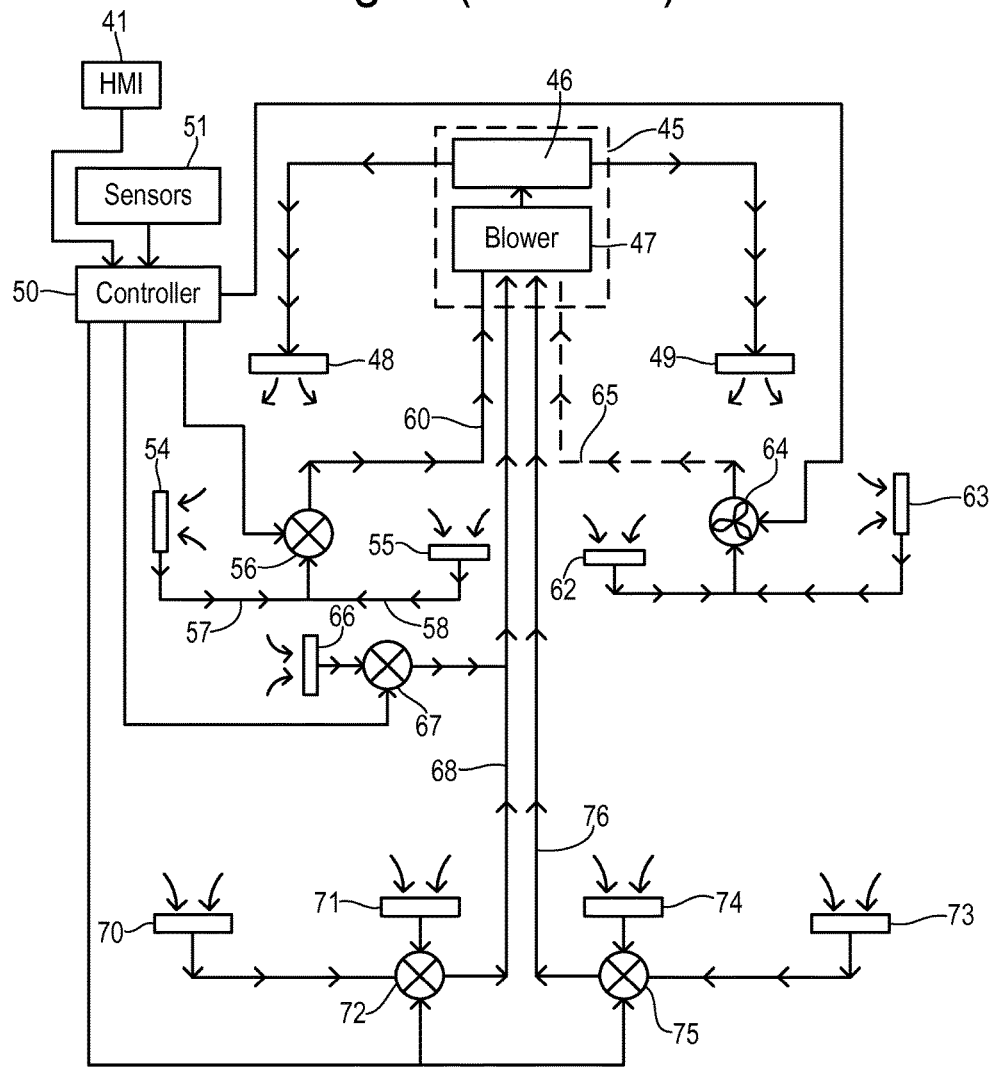
FIG. 4 is a schematic view of air circulation according to one embodiment of the invention.

A more desirable circulation pattern can be obtained using a system of the present invention as shown schematically in FIG. 4, in which a plurality of suction returns are separately adjusted automatically according to the seat occupancy and/or the desire for cooling/heating at each occupied seat. An air handling unit (AHU) 45 including a heat exchanger 46 and blower 47 supplies conditioned air to register vents 48 and 49. A greater or lesser number of register vents can be employed, and they are deployed as known in the art. FIG. 4 may represent a whole cabin climate system or may represent a particular zonal unit within the whole system for supplying conditioned air to just a portion of a passenger cabin.

In the embodiment of FIG. 4, airflow is customizable to the actual passenger occupancy so that the climate control system efficiently provides conditioned air only where it is needed. A controller 50 is coupled to a plurality of sensors 51 to automatically determine seat occupancy. Sensors 51 may include seat belt switch sensors, seat load sensors, or optical recognition sensors for detecting the presence of an occupant in each respective seat. The occupancy determining apparatus may alternatively include other existing vehicle modules that employ occupant information such as a passenger restraint control module. Based on information gathered, controller 50 generates respective flow commands provided to various flow control valves to determine the amount of flow through each one of a plurality of suction returns. More particularly, by determining seat occupancy, one or more seating locations can be identified for receiving an enhanced air flow.

Seat occupancy can alternately be manually specified by an occupant via a human machine interface (HMI) 41 coupled to controller 50. In addition to specifying which seat locations are to be considered occupied, the user may also specify further enhancement or reduction in airflow to be directed to a particular occupied seat. HMI 41 may include manually activated switches or dials as conventionally used to control a climate control system.

A suction return 54 and a suction return 55 may be associated with a driver seat location. A flow control valve 56 is connected in series with suction returns 54 and 55 via conduits 57 and 58. An outlet of flow control valve 56 is coupled to an intake of blower 47 by a duct 60. Flow control valve 56 is configured to selectably modify a respective flow coefficient in order to control the ability of air to flow through suction returns 54 and 55 under direct control of a flow command received from controller 50. As shown, one flow control valve may be used to control the suction obtained from a plurality of suction returns in tandem (associated with the same or different seating locations). Alternatively, a flow control valve could be associated with just one suction return or even be integrated into the suction return. Thus, a suction return 66 may also be associated with the driver seat location and is fluidically coupled to a flow control valve 67 that feeds into a duct 68 for returning air from suction return 66 to blower 47 in response to a separate flow command received by flow control valve 67 from controller 50.

A front passenger seating location may be associated with suction returns 62 and 63 which are connected to a dedicated fan 64 likewise receiving a flow command from controller 50. The flow via fan 64 can be varied as a result of changing the fan speed according to the flow command or by including an integral valve (not shown). As used herein, the term flow control element refers to either a flow control valve, a dedicated flow control fan, or a combination of the two. The output of fan 64 is coupled to blower 47 via the interior cabin as shown by line 65. The return flow may comprise a diffusion of air along the floor or another inconspicuous location not affecting the airflow felt by an occupant.

A first rear seat position may be associated with suction returns 70 and 71 that are each connected in series with a flow control valve 72, supplying its output to blower 47 by duct 68. Similarly, a second rear seat position is associated with suction returns 73 and 74 which are connected to a flow control valve 75. A flow coefficient of suction returns 73 and 74 is controlled in response to a flow command applied to flow control valve 75 by controller 50, resulting in a variable flow to blower 47 via a duct 76.

In accordance with FIG. 4, at least some individual seating locations may be associated with a particular group of suction returns all of which may be controlled by adjusting a respective flow coefficient of a single flow control valve. Thus, the locations of the group of suction returns can be optimized to each respective occupant seating location and the corresponding flow control valve would then be activated in accordance with whether a corresponding occupant is present.

Figure 5:
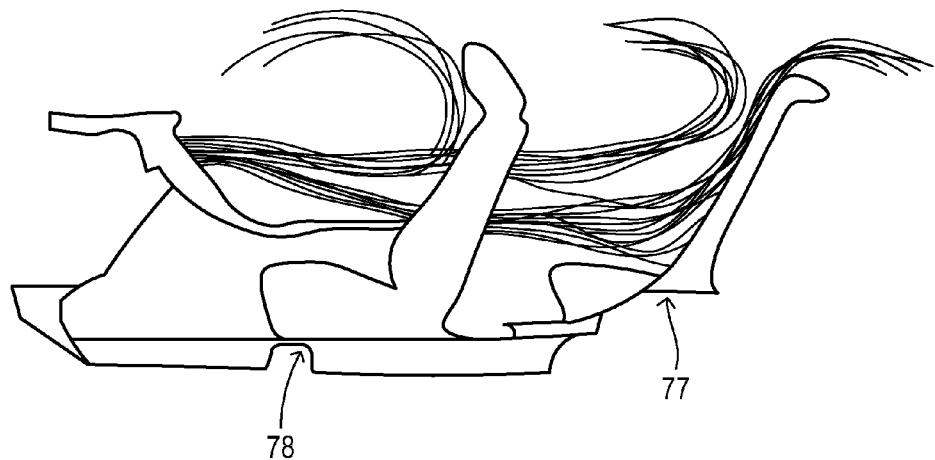
FIGS. 5 and 6 are side views showing plot of airflow obtained using the present invention.
Figure 6:
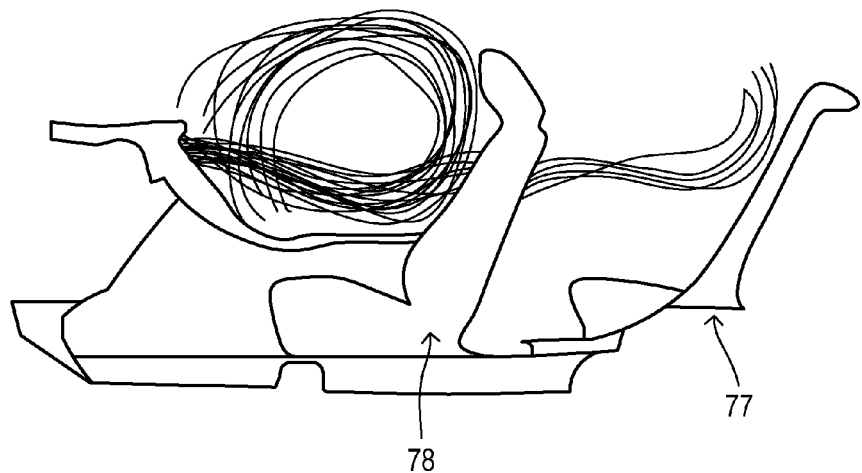

FIG. 5 is a side view showing an airflow pattern to a rear seat location 77 and a front seat location 78 when suction surfaces associated with rear seat location 77 are active. The density of the flow lines illustrates the density of airflow. Thus, significant airflow is received by the rear seat occupants. FIG. 6 illustrates airflow obtained with suction returns associated with the rear seating locations being deactivated (i.e., with their respective flow coefficient being reduced or eliminated). Thus, the airflow pattern is concentrated toward a front seating location.

Figure 7:
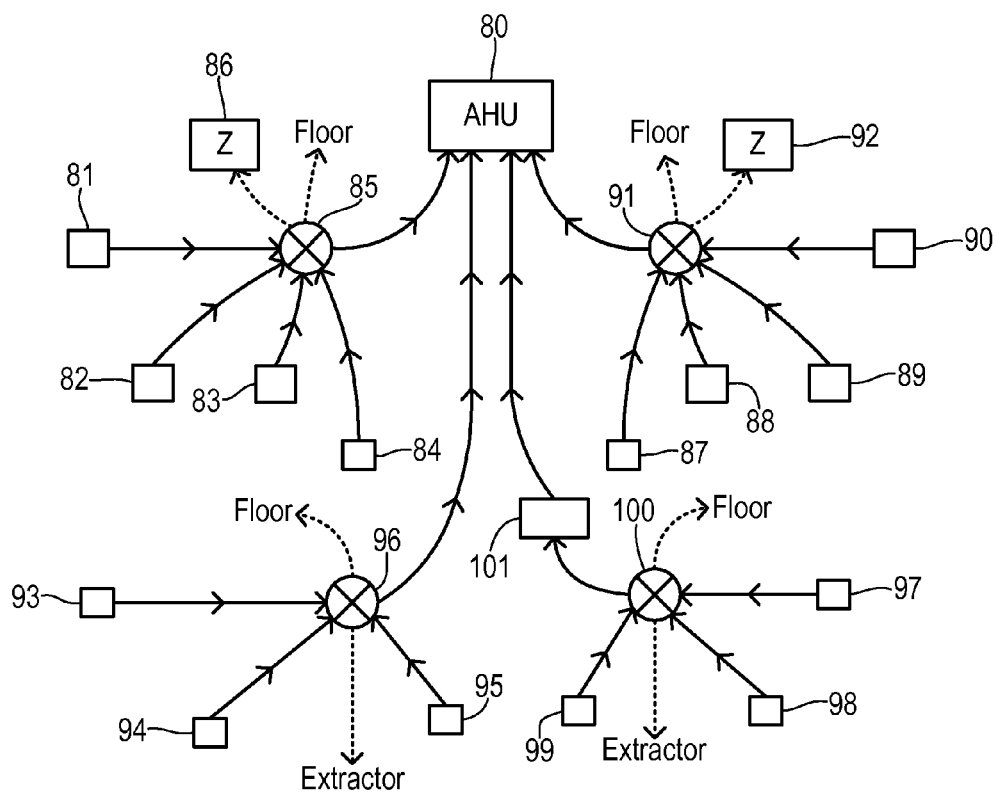
FIG. 7 is a schematic view of air circulation according to another embodiment of the invention.

FIG. 7 illustrates another embodiment of the invention optionally including zonal air handling units together with a main AHU. Specifically, a main AHU 80 may be located at the front of a passenger cabin behind an instrument panel (not shown). A driver seating location may have a plurality of suction returns 81-84 each connected to a flow control valve 85. Flow control valve 85 may be a proportional valve and may have one or more selectable outlets, such as an outlet connected to main AHU 80 and another outlet for redirecting air toward the floor, for example. In an alternative embodiment, instead of being connected to main AHU 80, an output of flow control valve 85 can be coupled to a zonal AHU 86 in order to condition air supplied to the driver seating location to a temperature that is independently controlled from other seating locations (via a separate heat exchanger or generation unit). Similarly, a front passenger seating location has suction returns 87-90 coupled with a flow control valve 91. Air flowing into suction returns 87-90 may be coupled to main AHU unit 80, to a zonal AHU 92, or back to the floor region.

A first rear seat location may have suction returns 93-95 associated therewith. A flow control valve 96 is connected in series between suction returns 93-95 and AHU 80. Flow control valve 96 may also be controlled to divert air flow to the floor or to an extractor (not shown). Similarly, a second rear seating location has suction returns 97-99 and a flow control valve 100. An auxiliary fan 101 may be connected between the output of flow control valve 100 and AHU 80 in order to supplement the suction that is available. Fan 101 can be controlled in tandem or independently with a blower in AHU 80 in order to adjust the size and/or shape of a localized comfort flow field around the associated seating location.

The present invention strategically locates various suction returns according to airflow patterns being sought. Suction returns 81 and 90 may preferably be located in a respective B-pillar next to the driver and front seat passenger, respectively. Suction returns 82 and 89 are preferably located on the outboard side of the front seats. Suction returns 83 and 88 are preferably located on the inboard side of the front seats, and suction returns 84 and 87 are mounted in a center console. As a result, each front seat passenger is located within a dedicated group of suction returns so that enhanced airflow is received at the respective seating locations. Flow control valves 85 and 91 provide respective nodes that may be turned on or off depending on the presence of an occupant and/or the desire of the occupant to receive conditioned air.

For the rear seating locations, suction returns 93 and 97 may preferably be located in the respective C-pillars. Suction returns 94 and 98 may preferably be located on a rear package tray behind the passengers, and suction returns 95 and 99 may preferably be located on a rear seat back.

Figure 8:
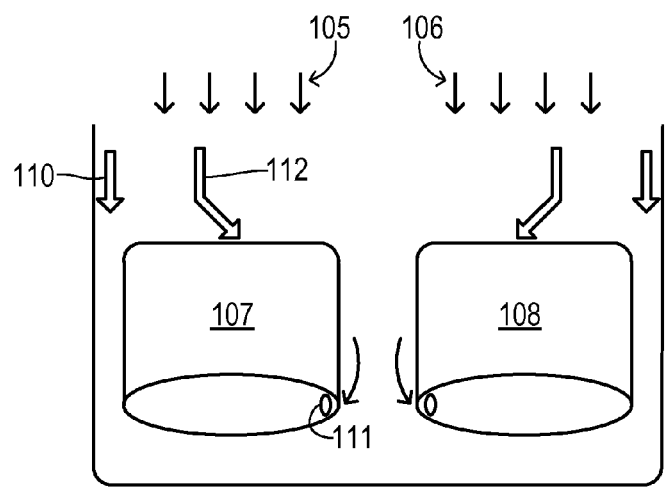
FIG. 8 is a top view showing alteration of an airflow resulting from suction surfaces installed at an inboard location.

Suction returns can be located to overcome certain prior art tendencies such as a wall jet as shown in FIG. 8. Air streams 105 and 106 are provided generally toward front seats 107 and 108. Due to normal airflow tendencies, a wall jet 110 would conventionally form along the side door and window thereby reducing the flow actually impinging on the occupant of seat 107. The present invention may preferably employ an in-board (i.e., center located) suction return 111, which may be located in a central side of seat 107, in a center console, or in the roof above seat 107. Suction return 111 reduces the bias of the flow along jet 110 and redirects it in the direction shown by arrow 112 to increase the airflow to the occupant of seat 107. When seats 107 and 108 are in distinct zones, the in-board suction returns have the additional benefit of increasing isolation between adjacent zones since they will reduce the mixing of the air streams.

Figure 9:
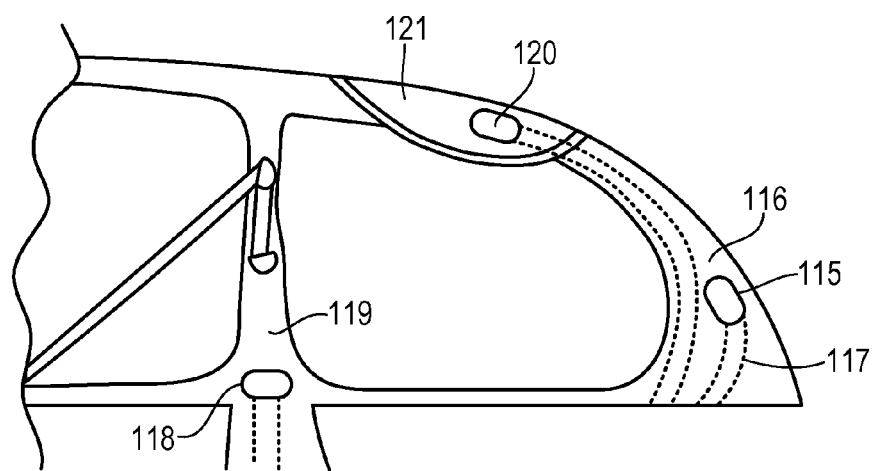
FIG. 9 illustrates suction surfaces installed at B-pillar and C-pillar locations in a vehicle.

Certain air return locations for placing suction returns adjacent the seating locations are shown in FIGS. 9-13. In FIG. 9, a suction return 115 is located in a C-pillar 116. A duct 117 passes within the interior trim of the vehicle to a blower input via a respective flow control valve (not shown). Similarly, a suction return 118 is located in a B-pillar 119, and a suction return 120 is located in a roof panel 121.

Figure 10:
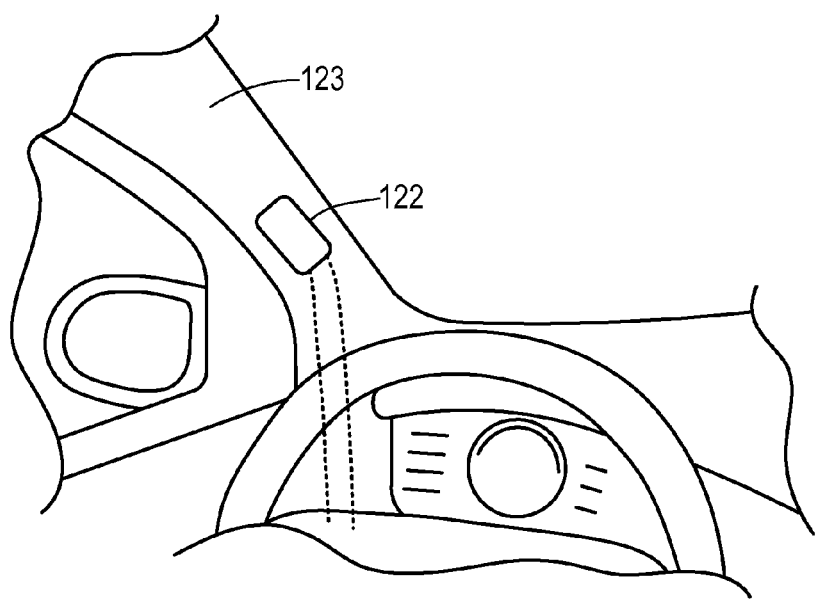
FIG. 10 illustrates a suction surface on an A-pillar in a vehicle.

As shown in FIG. 10, a suction return 122 may also be located in an A-pillar 123.

Figure 11:
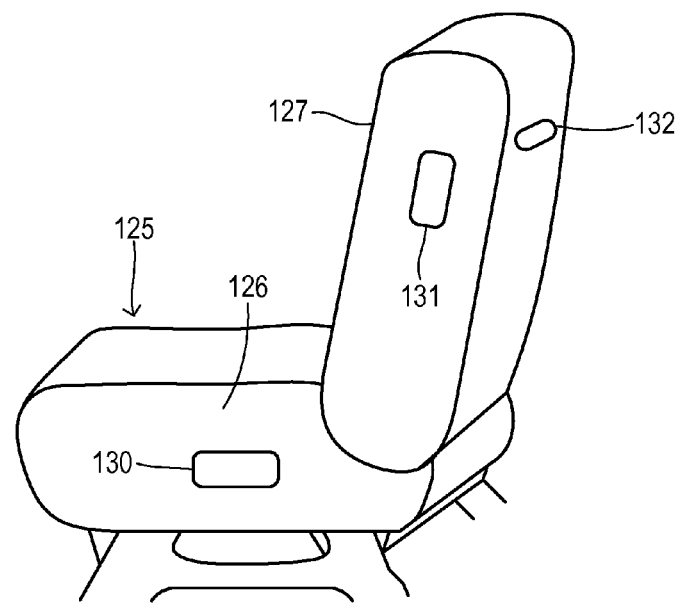
FIG. 11 illustrates various locations for suction surfaces on a vehicle seat.

The vehicle seats provide several useful locations for suction returns. As shown in FIG. 11, a seat 125 has a seat bottom 126 and a seat back 127. Side suction returns 130 and 131 are installed in the sides of seat bottom 126 and seat back 127, respectively. A suction return 132 is installed on a rearward facing surface of seat back 127.

Figure 12:
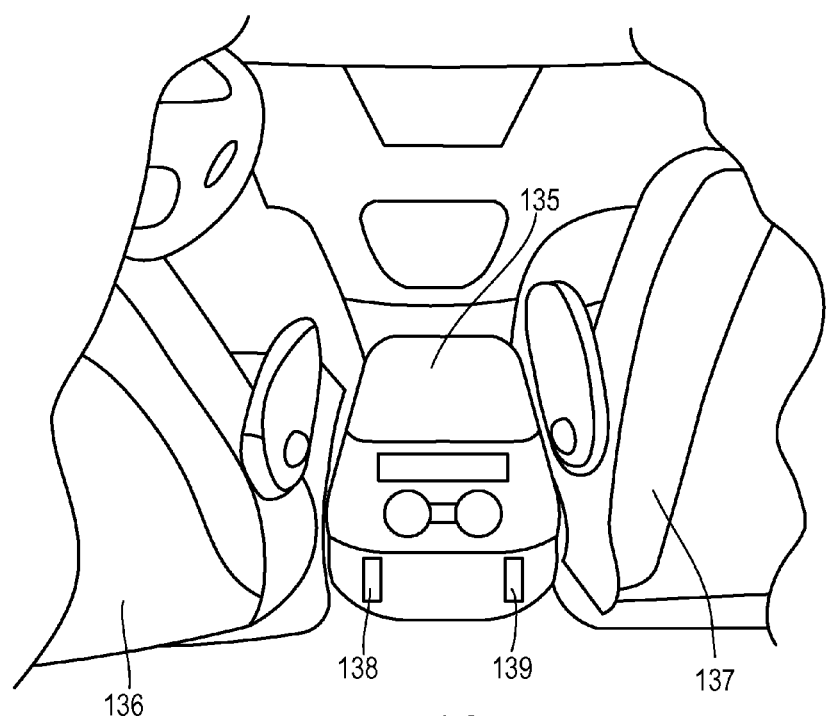
FIG. 12 illustrates suction surfaces on a center console in a vehicle.

FIG. 12 shows a center console 135 located between front seats 136 and 137. A left suction return 138 and a right suction return 139 are installed in a side surface of center console 135.

Figure 13:
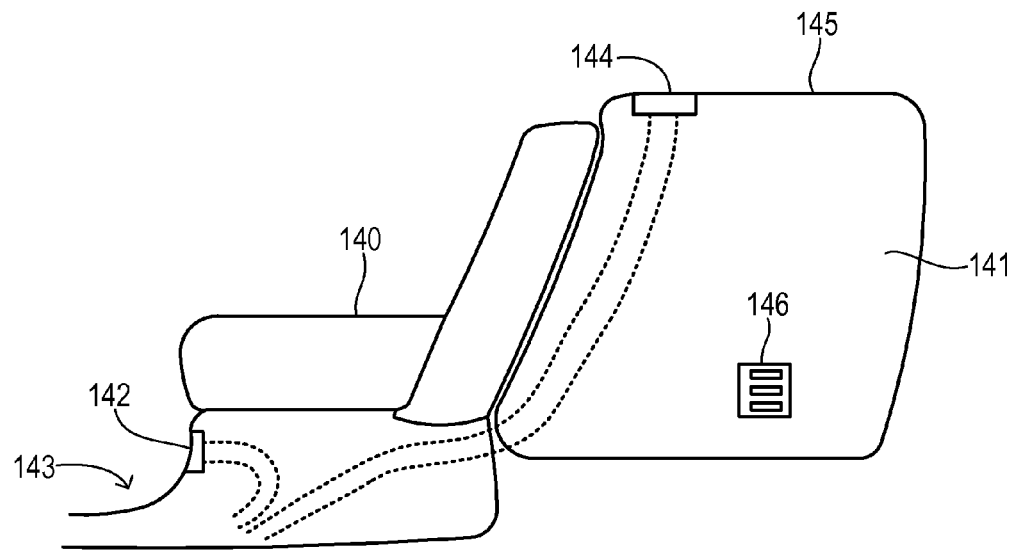
FIG. 13 illustrates suction surfaces in a floor well and in a package tray of a vehicle.

FIG. 13 shows a rear seat 140 located in front of a trunk space 141. A suction return 142 is located in a floorwell 143. Another suction return 144 is mounted to a rear package tray 145. Also within trunk space 141, an extractor 146 may be provided for venting internal air to the outside of the vehicle based on pressure differences.

Figure 14:
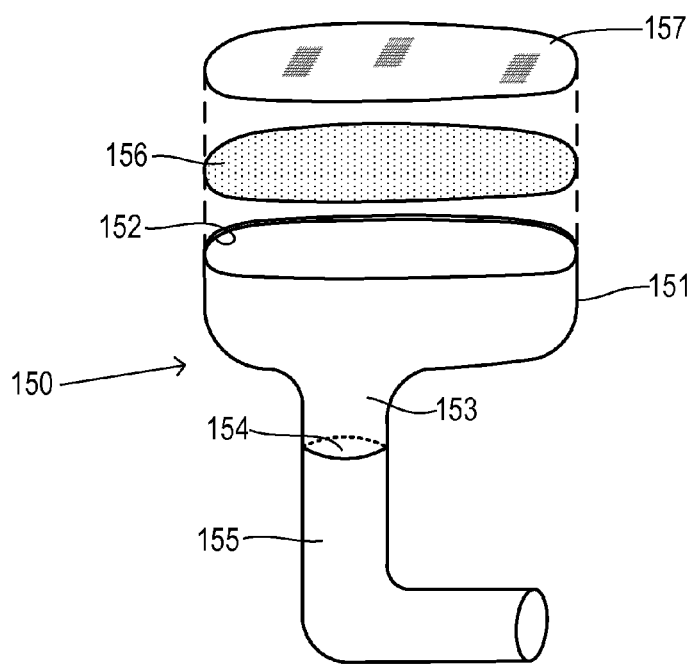
FIG. 14 is an exploded, perspective view of a suction return.

FIG. 14 shows a suction return 150 in greater detail. The cross-sectional area of the opening to the passenger cabin should be large enough to avoid large local pressure drops that would result in noise, but small enough to create sufficient pressure drop to allow manipulation of the airflow. A suction return body 151 has an inlet portion 152 and a conduit portion 153 in fluid communication with each other. Conduit 153 has an outlet 154 coupled to a duct 155. Inlet 152 is covered by a perforated plate 156 and a fabric cover 157. The overall shape and size of suction return 150 may be easily adjusted to conform with packaging requirements for the various locations throughout the vehicle. The perforations in plate 156 provide the desired cross-sectional area for controlling the pressure drop. Fabric cover 157 is preferably selected to match the adjacent interior trim surfaces so that the suction returns have an unobtrusive appearance.

Figure 15:
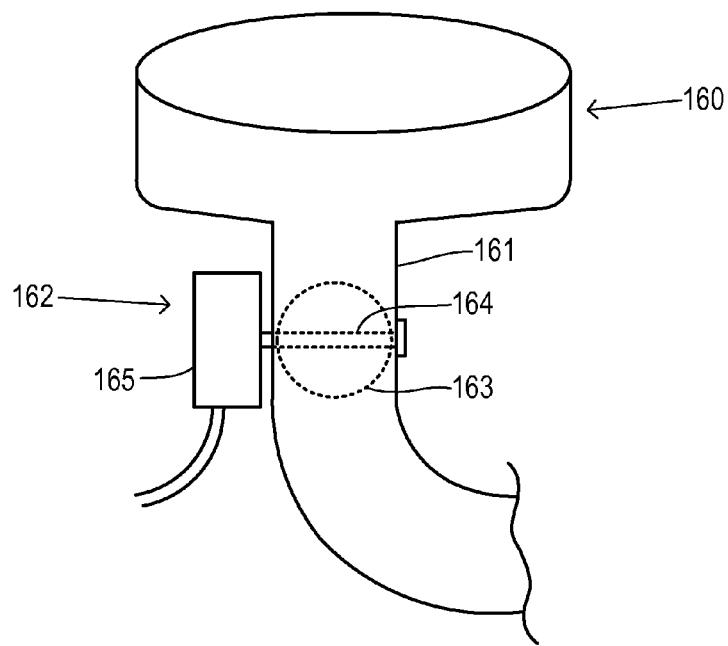
FIG. 15 is a side view of a suction return with a valve and a valve actuator.

The flow control valves may be preferably integrated with each respective suction return as shown in FIG. 15. A suction return 160 has a conduit section 161 containing a butterfly valve 162. Preferably, conduit section 161 is cylindrically shaped so that butterfly valve 162 can employ a circular plate 163 rotatable on a shaft 164 within conduit section 161. When plate 163 is located parallel to the axis of conduit 161, butterfly valve 162 is in an open position and provides a maximum flow coefficient. When plate 63 is rotated to be transverse to the longitudinal axis of conduit section 161, the valve is in a closed position and provides the minimum flow coefficient (which may be substantially zero). At intermediate rotational positions, an intermediate flow coefficient may be obtained for specific tailoring of airflows as desired. An actuator servo-motor 165 controlling the position of shaft 164 is connected to a climate control module for receiving commands to place the butterfly valve in the desired position.

Figure 16:
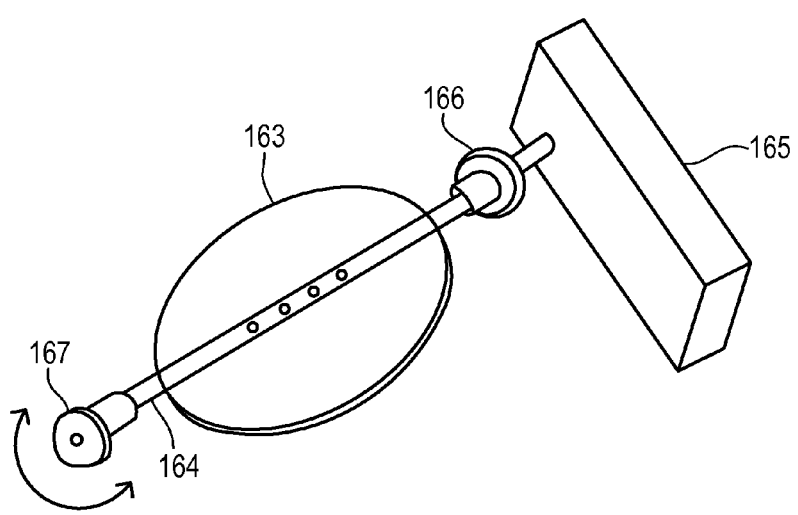
FIG. 16 is a perspective view of the valve and valve actuator.

The butterfly valve elements are shown in greater detail in FIG. 16. A pair of bushings 166 and 167 is provided for mounting shaft 164 to the conduit. Other conventional means may be provided for attaching actuator 165 to the exterior side of the conduit.

Valves other than a butterfly valve could also be used, such as a spring-roller assembly actuated with a solenoid or motor, or a hinged door that latches in response to a solenoid. The valve could also be implemented using a duct with a variable cross-section actuated by shape-memory alloys, a solenoid, or other means.

In accordance with the foregoing, an automotive HVAC system has been described having significant advantages over the prior art. Greater occupant comfort is achieved with less airflow and less overall energy consumption. A tailored airflow is obtained that minimizes the adjustments an occupant needs to make with the climate system in order to remain comfortable. The invention enables the use of distributive heating and cooling units such as thermoelectric units, distributed PTC heaters, micro-compressors, split evaporators, and other devices. The invention has a modular architecture that can be easily adapted to various vehicle designs while employing highly reusable parts.

What is claimed is:

1. A heating, ventilating, air conditioning system for providing an airflow in a vehicle having a plurality of seating locations in a passenger cabin for respective passengers of the vehicle, comprising:
   a plurality of outlet vents providing a shared outlet airflow to be distributed to the plurality of seating locations;
   a plurality of suction returns disposed at various air return locations adjacent to the seating locations within the vehicle;
   an air handling unit in fluid communication between the suction returns and the outlet vents;
   a plurality of flow control elements each in series with at least one respective suction return for selectably modifying a respective flow of the respective suction return in response to a respective flow command so that a corresponding seating location receives a modified portion of the shared outlet airflow;
   an occupancy determining apparatus for identifying one or more seating locations for receiving enhanced airflow; and
   a controller for generating the respective flow commands in response to the identified seating locations.

2. The system of claim 1 wherein the flow control elements include a dedicated fan for blowing air from a respective suction return to an outlet in the passenger cabin.

3. The system of claim 1 wherein the flow control elements include a valve selectably modifying a flow coefficient of a respective suction return.

4. The system of claim 1 wherein the air handling unit comprises:
   a blower; and
   a heat exchanger coupled in series with the blower.

5. The system of claim 1 wherein the air handling unit is a central unit providing conditioned air throughout the passenger cabin of the vehicle.

6. The system of claim 1 wherein the passenger cabin contains a plurality of groups of seating locations, and wherein the air handling unit is a zonal unit providing conditioned air to one of the groups of seating locations.

7. The system of claim 1 wherein the passenger cabin contains a plurality of groups of seating locations, wherein the system includes a plurality of air handling units, and wherein each air handling unit is a zonal unit providing conditioned air to a respective one of the groups of seating locations.

8. The system of claim 1 wherein each suction return is disposed on a respective surface within the vehicle, wherein each surface is selected from a group comprising a seat surface, a console surface, a pillar surface, a roof surface, a package tray surface, and a floor well surface.

9. The system of claim 1 wherein a suction return is comprised of:
   an inlet having an opening for receiving air from the passenger cabin; and
   a conduit in communication with the inlet and having an outlet for directing the received air to the air handling unit.

10. The system of claim 9 further comprising:
    a perforated plate covering the opening.

11. The system of claim 10 further comprising:
a fabric finisher covering the perforated plate.

12. The system of claim 9 further comprising:
a duct routed within the vehicle connecting the conduit to the air handling unit.

13. The system of claim 9 wherein the flow control elements include a plurality of flow control valves each selectably modifying a flow coefficient of a respective suction return, and wherein a flow control valve is integral with the suction return and comprises:
a movable plate disposed between the inlet and the outlet, wherein the movable plate is rotatable between an open position and a closed position for selectably controlling flow of the received air to the outlet; and
an electrically controlled actuator for positioning the movable plate according to the respective flow command.

14. The system of claim 1 wherein the occupancy determining apparatus is comprised of mechanical sensors generating respective occupant signals when an occupant is present in each respective seat, and wherein the controller configures the respective flow commands to shift the airflow according to the occupant signals.

15. The system of claim 1 wherein the occupancy determining apparatus is comprised of a human interface generating respective occupant signals in response to manual activation, and wherein the controller configures the respective flow commands to shift the airflow according to the occupant signals.

16. A heating, ventilation, air conditioning system for providing an airflow in a passenger cabin of a vehicle, comprising:
a plurality of seats providing corresponding seating locations for respective occupants;
an occupancy determining apparatus for identifying one or more seating locations containing a respective occupant;
a plurality of outlet vents providing a shared outlet airflow to be distributed to the plurality of seating locations;
a plurality of suction returns disposed on respective surfaces of the vehicle, wherein each suction return is associated with at least one seating location and dissociated with at least one other seating location;
an air handling unit in fluid communication between the suction returns and the outlet vents;
a plurality of flow control elements each in series with at least one respective suction return for selectably modifying a respective flow of the respective suction return in response to a respective flow command so that a corresponding seating location receives a modified portion of the shared outlet airflow; and
a controller for generating the respective flow commands in response to the identified seating locations so that a flow control element in series with a suction return associated with a seating location containing a respective occupant creates a reduced pressure region and a flow control element in series with a suction return associated with a seating location not containing a respective occupant does not create a reduced pressure region.

17. The system of claim 16 wherein each suction return is disposed on a respective surface within the vehicle, wherein each surface is selected from a group comprising a seat surface, a console surface, a pillar surface, a roof surface, a package tray surface, and a floor well surface.

18. The system of claim 16 wherein a suction return is comprised of:
an inlet having an opening for receiving air from the passenger cabin; and
a conduit in communication with the inlet and having an outlet for directing the received air to the air handling unit.

19. The system of claim 18 further comprising:
a perforated plate covering the opening.

20. The system of claim 19 further comprising:
a fabric finisher covering the perforated plate.

21. The system of claim 18 further comprising:
a duct routed within the vehicle connecting the conduit to the air handling unit.

22. The system of claim 18 wherein a flow control element is comprised of a flow control valve integral with the suction return, wherein the flow control valve comprises:
a movable plate disposed between the inlet and the outlet, wherein the movable plate is rotatable between an open position and a closed position for selectably controlling flow of the received air to the outlet; and
an electrically controlled actuator for positioning the movable plate according to the respective flow command.

23. The system of claim 16 wherein the occupancy determining apparatus is comprised of mechanical sensors generating respective occupant signals when an occupant is present in each respective seat.

24. The system of claim 16 wherein the occupancy determining apparatus is comprised of a human interface generating respective occupant signals in response to manual activation.

* * * * *